United States Patent
Arai

(10) Patent No.: US 7,275,695 B2
(45) Date of Patent: Oct. 2, 2007

(54) PORTABLE TERMINAL AND FUNCTION LIMITING METHOD

(75) Inventor: Daisuke Arai, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 11/411,937

(22) Filed: Apr. 27, 2006

(65) Prior Publication Data

US 2006/0264240 A1 Nov. 23, 2006

(30) Foreign Application Priority Data

May 10, 2005 (JP) ............................. 2005-137524

(51) Int. Cl.
- G06K 19/00 (2006.01)
- H04B 1/38 (2006.01)
- H04M 1/00 (2006.01)
- H04M 1/66 (2006.01)
- H04M 1/68 (2006.01)

(52) U.S. Cl. ...................... 235/487; 455/558; 455/410; 455/411

(58) Field of Classification Search ................ 235/487; 455/558, 410, 411; 726/4
See application file for complete search history.

(56) References Cited

U.S. PATENT DOCUMENTS

| | | | | |
|---|---|---|---|---|
| 5,436,969 A | * | 7/1995 | Kobayashi | 379/433.09 |
| 6,044,470 A | * | 3/2000 | Kuriyama | 726/19 |
| 6,119,020 A | * | 9/2000 | Miller et al. | 455/558 |
| 6,179,205 B1 | * | 1/2001 | Sloan | 235/382 |
| 6,205,327 B1 | * | 3/2001 | Sentinelli | 455/407 |
| 6,518,927 B2 | * | 2/2003 | Schremmer et al. | 343/702 |
| 6,542,758 B1 | | 4/2003 | Chennakeshu et al. | |
| 6,714,799 B1 | * | 3/2004 | Park et al. | 455/558 |
| 6,729,550 B2 | * | 5/2004 | Seita et al. | 235/492 |
| 6,847,816 B1 | * | 1/2005 | Sarradin | 455/407 |
| 7,054,624 B2 | * | 5/2006 | Cocita | 455/419 |
| 7,151,922 B2 | * | 12/2006 | Sashihara et al. | 455/412.2 |
| 7,174,160 B2 | * | 2/2007 | Takae et al. | 455/411 |
| 7,181,429 B1 | * | 2/2007 | Lee | 705/41 |
| 2002/0003164 A1 | | 1/2002 | Nakagawa et al. | |
| 2002/0081179 A1 | * | 6/2002 | Vallstrom | 414/333 |

(Continued)

FOREIGN PATENT DOCUMENTS

GB 2 370 728 A 7/2002

(Continued)

Primary Examiner—Daniel Walsh
(74) Attorney, Agent, or Firm—Oblon, Spivak, McClelland, Maier & Neustadt, P.C.

(57) ABSTRACT

A portable terminal including a noncontact IC card function unit and capable of being used by inserting a subscriber information card is provided, in which a noncontact IC card use permission list on which numbers of subscribers permitted to use a noncontact IC card function are registered is prepared in advance; the subscriber number recorded on the subscriber information card is compared with the noncontact IC card use permission list to judge whether or not the relevant subscriber number is in the list, and if the relevant subscriber number is not included in the list, only the function of noncontact IC card function unit is stopped. Accordingly an arbitrary third party is prevented from using the noncontact IC card function in a portable terminal incorporating a noncontact IC card function and capable of being used by inserting a subscriber information card such as an SIM card.

7 Claims, 3 Drawing Sheets

U.S. PATENT DOCUMENTS

| | | | |
|---|---|---|---|
| 2003/0006280 A1* | 1/2003 | Seita et al. | 235/380 |
| 2003/0190908 A1* | 10/2003 | Craven | 455/411 |
| 2003/0213849 A1* | 11/2003 | Luu | 235/492 |
| 2004/0005911 A1* | 1/2004 | Guirauton et al. | 455/558 |
| 2004/0043752 A1* | 3/2004 | Matsumura | 455/405 |
| 2004/0077372 A1* | 4/2004 | Halpern | 455/550.1 |
| 2004/0087337 A1* | 5/2004 | Takae et al. | 455/558 |
| 2004/0127256 A1* | 7/2004 | Goldthwaite et al. | 455/558 |
| 2004/0246607 A1 | 12/2004 | Watson et al. | |
| 2005/0075092 A1* | 4/2005 | Kim | 455/411 |
| 2005/0090285 A1* | 4/2005 | Murayama | 455/558 |
| 2005/0098628 A1* | 5/2005 | Hashimoto et al. | 235/383 |
| 2005/0107114 A1* | 5/2005 | Ocock | 455/550.1 |
| 2005/0148366 A1* | 7/2005 | Okada | 455/558 |
| 2005/0164738 A1* | 7/2005 | Liu | 455/558 |
| 2005/0250522 A1* | 11/2005 | Gilbert et al. | 455/466 |
| 2006/0009196 A1* | 1/2006 | Lai et al. | 455/411 |
| 2006/0015263 A1* | 1/2006 | Stupp et al. | 702/19 |
| 2006/0058064 A1* | 3/2006 | Satou | 455/558 |
| 2006/0101136 A1* | 5/2006 | Akashika et al. | 709/223 |
| 2006/0105745 A1* | 5/2006 | Frank | 455/411 |
| 2006/0116169 A1* | 6/2006 | Park | 455/558 |
| 2006/0124735 A1* | 6/2006 | Mizuno et al. | 235/382 |
| 2006/0148404 A1* | 7/2006 | Wakim | 455/41.2 |
| 2006/0168657 A1* | 7/2006 | Baentsch et al. | 726/21 |
| 2006/0168658 A1* | 7/2006 | Kallio | 726/21 |
| 2006/0178166 A1* | 8/2006 | Luu et al. | 455/558 |
| 2006/0189307 A1* | 8/2006 | Ritter | 455/419 |
| 2006/0264240 A1* | 11/2006 | Arai | 455/558 |

FOREIGN PATENT DOCUMENTS

| | | |
|---|---|---|
| JP | 4-332245 | 11/1992 |
| JP | 2004-287594 | 10/2004 |
| JP | 2005-11116 | 1/2005 |
| JP | 2005-64923 | 3/2005 |
| JP | 2005-301489 | 10/2005 |
| JP | 2005301489 A * | 10/2005 |
| JP | 2006-13659 | 1/2006 |

* cited by examiner

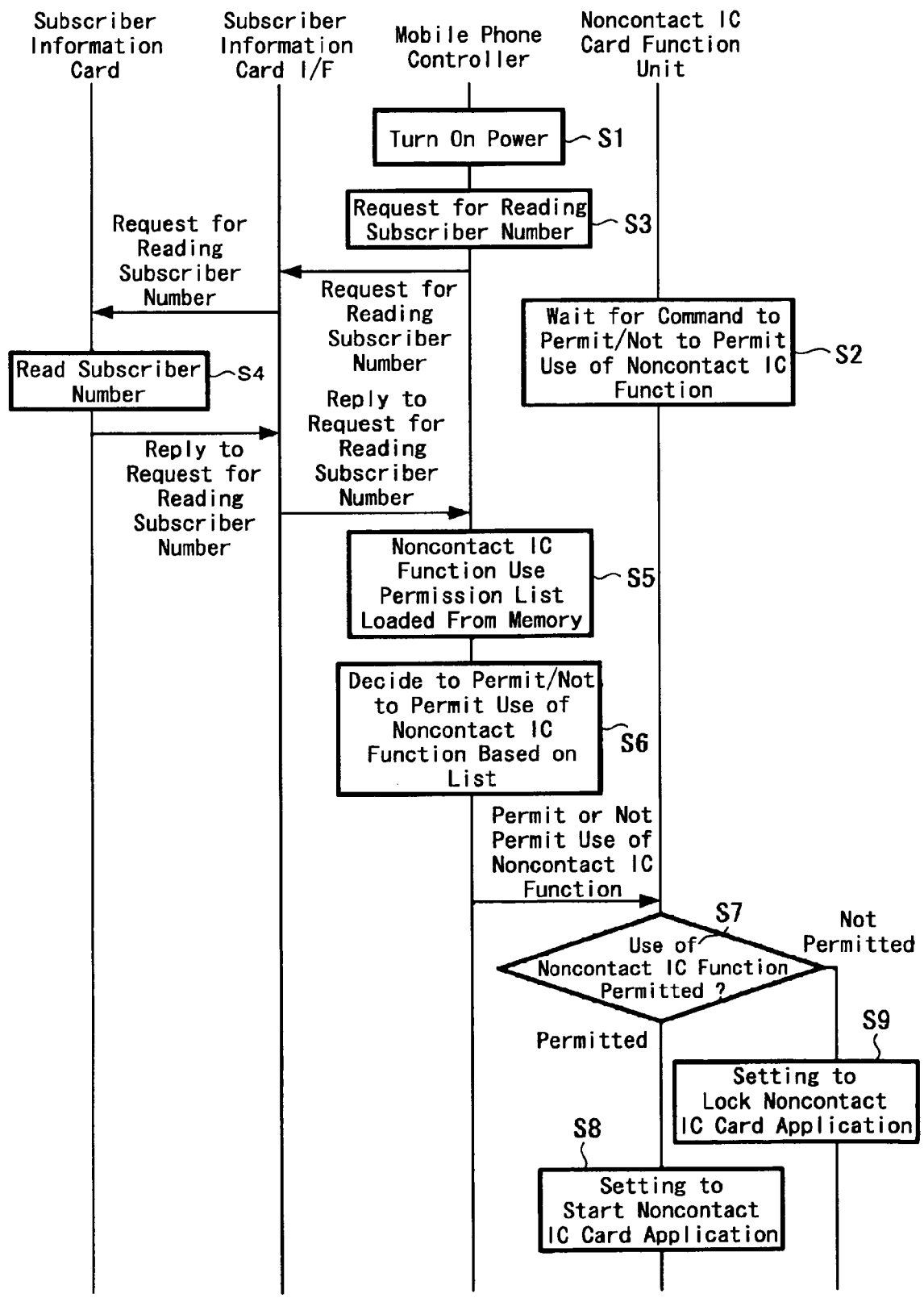

PORTABLE TERMINAL AND FUNCTION LIMITING METHOD

CROSS REFERENCES TO RELATED APPLICATIONS

The present invention contains subject matter related to Japanese Patent Application JP 2005-137524 filed in the Japanese Patent Office on May 10, 2005, the entire contents of which being incorporated herein by reference.

BACKGROUND OF THE INVENTION

1. Field of the Invention

The present invention relates to a portable terminal and a function limiting method, particularly to a portable terminal suitably applied to a mobile phone unit or the like incorporating a noncontact IC (Integrated Circuit) card function unit and a method of limiting the use of the noncontact IC card function.

2. Description of the Related Art

Regarding a mobile phone unit which uses an SIM (Subscriber Identity Module) card, such as a GSM (Global Systems for Mobile communications) terminal and a UMTS (Universal Mobile Telecommunications System) terminal, when the SIM card having the subscriber number of a third party is inserted therein, the mobile phone unit can be used by the third party. The SIM card is an IC card issued by a mobile phone company, in which subscriber information is recorded.

Japanese Published Patent Application No. 2004-193641 discloses an automobile telephone apparatus in which an SIM card is used to enable selective use of a plurality of mobile phone units of different telephone numbers, for example.

SUMMARY OF THE INVENTION

In the case where the noncontact IC card function such as FeliCa® is incorporated in a GSM/UMTS terminal, telephone function based on subscriber information about a third party can be used. In this case, however, the third party may also use a noncontact IC card application which the owner of the mobile phone unit uses.

For example, if the owner of a mobile phone unit lends his/her mobile phone unit incorporating noncontact IC card function to a third party, the third party may use a noncontact IC card application of the mobile phone unit at will.

The present invention addresses the above-identified and other problems associated with conventional methods and apparatuses. It is desirable to provide a portable terminal incorporating noncontact IC card function and capable of being used when inserting a subscriber information card such as an SIM card, in which the noncontact IC card function is prevented from being used by an arbitrary third party.

A portable terminal according to an embodiment of the present invention includes a noncontact IC card function unit and is capable of being used when a subscriber information card is inserted, in which a noncontact IC card use permission list on which numbers of subscribers permitted to use the noncontact IC card function are registered is prepared in advance, the subscriber number recorded on the subscriber information card is compared with the noncontact IC card use permission list to judge whether or not the relevant subscriber number is in the list, and if the relevant subscriber number is not included in the list, only the function of the noncontact IC card function unit is stopped.

According to the above-described configuration, when a subscriber information card of a third party, which is different from that of the owner of the portable terminal, is inserted and if the subscriber number of the third party is not registered on the noncontact IC card use permission list, the third party is not permitted to use the noncontact IC card function which the owner of the portable terminal uses.

BRIEF DESCRIPTION OF THE DRAWINGS

FIG. 3 is a sequence diagram of function lock operation according to an embodiment of the present invention.

DESCRIPTION OF THE PREFERRED EMBODIMENTS

Hereinafter, embodiments of the present invention are explained, however, the present invention is not limited thereto.

Figure 1:
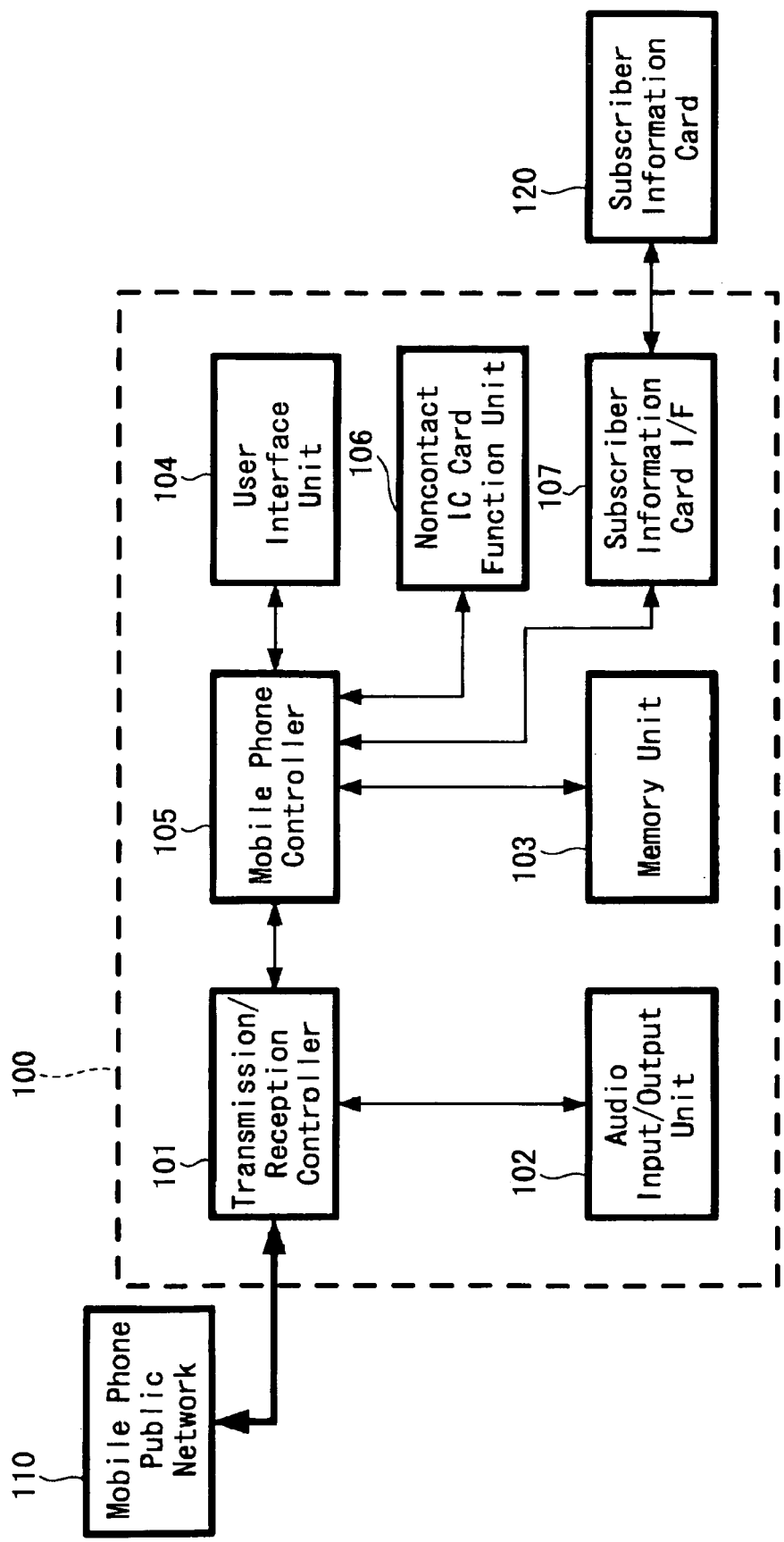
FIG. 1 is a block diagram showing a circuit configuration of a mobile phone unit according to an embodiment of the present invention.
Figure 2:
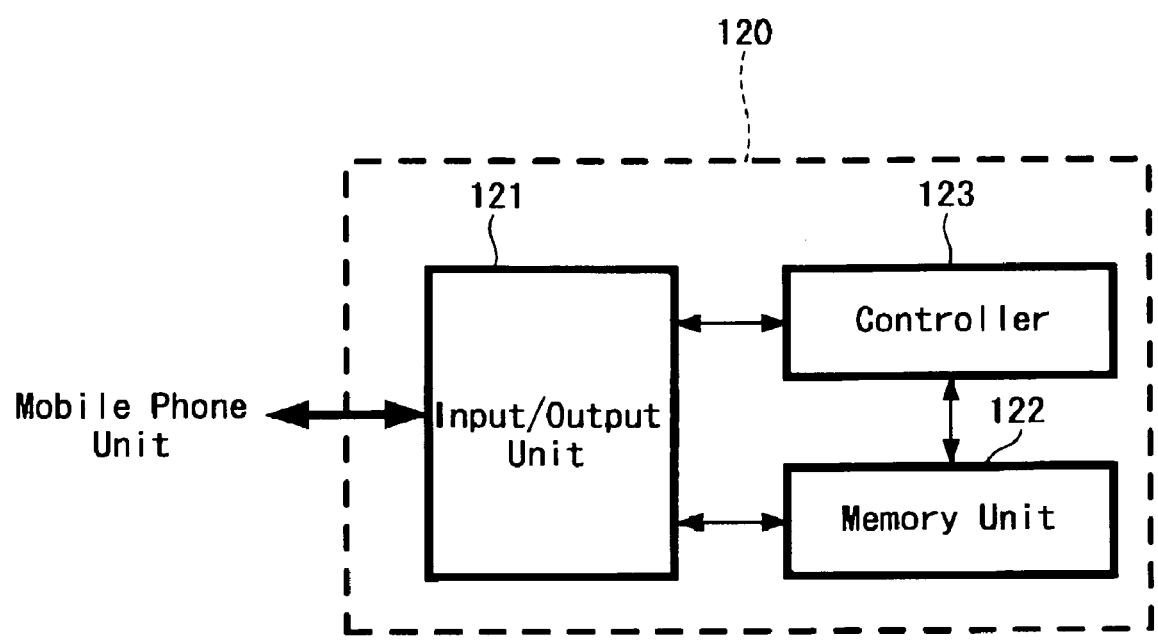
FIG. 2 is block diagram showing a circuit configuration of a subscriber information card according to an embodiment of the present invention.

First, referring to FIGS. 1 and 2, explanation is made regarding an example of a mobile phone unit to which a portable terminal incorporating noncontact IC card function according to an embodiment of the present invention is suitably applied.

FIG. 1 is a block diagram showing a circuit configuration of a mobile phone unit according to an embodiment of the present invention. As shown in FIG. 1, similarly to a known mobile phone unit performing mobile communication, a mobile phone unit 100 is configured to have: a transmission and reception controller 101 including an antenna for wireless communication with a mobile phone public network 110 through a base station not shown in the figure, an RF circuit, a modem and the like; an audio input/output unit 102 including a speaker which outputs a received audio signal and a microphone which inputs an audio signal to be transmitted; a nonvolatile memory unit 103 functioning as memory means; a user interface unit 104 including operational keys for performing transmission, reception, inputting telephone number and the like, and an image display device used as display means; and a mobile phone controller 105 functioning as control means for controlling those units.

The mobile phone unit 100 further includes: a noncontact IC card function unit 106, such as FeliCa®, which communicates with a reader/writer in a noncontact manner to perform electronic settlement, personal authentication and the like; and a subscriber information card interface (hereinafter referred to as subscriber information card I/F) 107 used as an interface between a subscriber information card 120 such as an SIM card on which subscriber information is recorded and the mobile phone unit. When the subscriber information card 120 is inserted in the mobile phone unit 100 of this embodiment, any function other than application software (hereinafter referred to as application) relating to the noncontact IC card function can be used without restriction.

Note that, the noncontact IC card function unit 106 may be incorporated in a device, or may have a detachable structure such as a card.

FIG. 2 is a block diagram showing a circuit configuration of a subscriber information card according to an embodiment of the present invention. A subscriber information card 120 is an IC card on which subscriber information is recorded, and can be attached to the mobile phone unit 100 in a detachable manner and further can be attached to a plurality of mobile phone units in a detachable manner. The subscriber information card 120 includes: an input/output unit 121 used as an interface for the mobile phone unit 100; a nonvolatile memory unit 122 functioning as memory means; and a controller 123 functioning as control means which controls those units.

In this embodiment, a subscriber number, such as IMSI (International Mobile Subscriber Identity), given to a subscriber using a service of a particular mobile phone company is stored in the memory unit 122. Further, a list (noncontact IC card use permission list) of the numbers of subscribers permitted to use the noncontact IC card function is stored in the memory unit 103 within the mobile phone unit 100.

Next, function lock operation by the mobile phone unit 100 having the above-described structure is explained.

FIG. 3 is a sequence diagram of the function lock operation according to an embodiment of the present invention. In FIG. 3, after the mobile phone unit 100 is powered on, the mobile phone controller 105 is turned on (Step S1). At this moment, the noncontact IC card function unit 106 does not start noncontact IC card application, but waits for a command to permit/not to permit the use of noncontact IC card (Step S2). After that, the mobile phone controller 105 makes a request for reading the subscriber number from the subscriber information card 120 (Step S3). When the subscriber information card 120 receives through the subscriber information card I/F 107 a request signal sent from the mobile phone controller 105 for reading the subscriber number, the controller 123 retrieves the subscriber number from the memory unit 122 (Step S4), and then transmits the subscriber number to the mobile phone controller 105.

The mobile phone controller 105 having received the subscriber number through the subscriber information card I/F 107 retrieves the noncontact IC card use permission list from the memory unit 103 (Step S5). After that, the mobile phone controller 105 compares the subscriber number received from the subscriber information card 120 with the noncontact IC card use permission list to decide whether or not the use of a noncontact IC card is permitted (Step S6), and the decision is given to the noncontact IC card function unit 106 as instruction. The noncontact IC card function unit 106 judges whether or not the instruction permits the use of the noncontact IC card (Step S7).

For example, if the relevant subscriber number is registered on the noncontact IC card use permission list, the mobile phone controller 105 instructs the noncontact IC card function unit 106 to permit the use of the noncontact IC card. In response to that, start setting of the noncontact IC card application is made by the noncontact IC card function unit 106 (Step S8). With this, when the noncontact IC card function unit 106 transmits or receives a radio signal, the noncontact IC card application can be started immediately.

On the other hand, if the relevant subscriber number is not registered on the noncontact IC card use permission list, the mobile phone controller 105 instructs the noncontact IC card function unit 106 not to permit the use of the noncontact IC card. In response to that, stop setting of the noncontact IC card application is made by the noncontact IC card function unit 106 (Step S9). With this, the function of the noncontact IC card function unit 106 can be prevented from being used by a third party.

Note that, the noncontact IC card use permission list is stored in the memory unit 103 within the mobile phone unit 100, only at the time when a mobile phone unit with a noncontact IC card function is purchased. For example, a third party permitted to use a noncontact IC card may be designated at the time of purchase, similarly to a system in which a telephone number is registered for using a service that largely discounts call charge for a telephone number registered in advance.

Alternatively, the function of editing a noncontact IC card use permission list may be provided in the mobile phone unit 100, allowing the user to alter accordingly the subscriber numbers registered on the noncontact IC card use permission list after the purchase.

According to the above-described embodiments, when a mobile phone unit incorporating the noncontact IC card function and capable of being used by inserting a subscriber information card is lent to a third party after pulling out the subscriber information card of the owner of the mobile phone unit, the third party may be prevented from using the noncontact IC card function that the owner of the mobile phone unit uses, unless the third party is registered on a noncontact IC card use permission list in advance. Therefore, security can be improved.

A modified example of the above-described embodiment, in which main power to the mobile phone unit 100 is cut, namely the power of the mobile phone controller 105 is off, is hereinafter explained.

For example, when the noncontact IC card function unit 106 in the power-off state receives a radio wave from a reader/writer, the noncontact IC card function unit 106 turns on the power of the mobile phone controller 105 and waits for a command to permit/not to permit the use of the noncontact IC card in a similar manner to the process of Step S2. Then, similarly to the process of Step S3, the mobile phone controller 105 makes a request for reading the subscriber number from the subscriber information card 120 (equivalent to Step S2). Subsequent processes are similar to those of Steps S3 to S9 in FIG. 3.

As described above, even if the power of a mobile phone unit 100 is off, operation similar to that at the time when the mobile phone unit 100 is powered on is performed, which is convenient for the user, because there is no need to turn on the mobile phone unit 100 each time he/she uses the noncontact IC card function.

Further, another modified example of the above-described embodiment is described.

If the noncontact IC card function unit 106 receives a radio wave from a reader/writer when the main power of the mobile phone unit 100 is off, specifically, when the power of the mobile phone controller 105 is off, the noncontact IC card function unit 106 directly makes a request to the subscriber information card 120 for reading the subscriber number from the subscriber information card 120 not through the mobile phone controller 105. Then, the noncontact IC card function unit 106 directly receives the subscriber number from the subscriber information card 120 (equivalent to Step S4), and the subsequent processes of Steps S5 to S9 are all carried out by the noncontact IC card function unit 106.

In this case, since the noncontact IC card function unit 106 and the subscriber information card 120 directly send and receives the subscriber number, the amount of time spent in judging whether to permit or not to permit the use of a noncontact IC card function is reduced. Further, in the case where the mobile phone unit 100 is broken down, operation is still possible by the noncontact IC card function unit 106 alone.

In addition, after the process of Step S9 shown in FIG. 3, the stop setting (lock) of the noncontact IC card application may be canceled by means of password information such as a password or predetermined key operation. That is, a third party using a subscriber information card not registered on the noncontact IC card use permission list may cancel the lock to the noncontact IC card application by inputting password information by means of key operation. Desirably, the password in this case can be changed appropriately by the owner of the mobile phone unit.

For example, the following mode may be considered: a mobile phone unit purchased in the name of a father is given to his child and typically the child is prevented from using noncontact IC card application, but if necessary or in an emergency, the noncontact IC card application can be used by the child directly asking the father the password to cancel the lock.

In such case, permission to use the noncontact IC card application can be selectively given according to need.

Note that, the present invention is not limited to the above-described embodiments, and various modifications and alterations can be made without deviating from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A portable terminal, including a noncontact integrated circuit (IC) card, configured to receive a subscriber information card, comprising:
a memory unit configured to store a noncontact IC card use permission list on which subscriber numbers identifying subscribers permitted to use the noncontact IC card are registered; and
a controller configured to compare the subscriber number recorded on said subscriber information card with the noncontact IC card use permission list stored in said memory unit to judge whether or not the subscriber number recorded on said subscriber information card is in the use permission list, and to decide whether or not to permit use of said noncontact IC card based on the judgment result,
wherein in a case where said subscriber number recorded on said subscriber information card is not included in the list, the controller is configured to only stop a function of said noncontact IC card, while permitting functions of the portable terminal to be carried out.

2. The portable terminal according to claim 1,
wherein when said portable terminal is powered on, said controller is configured to read the subscriber number of said subscriber information card, and to compare the read subscriber number with the noncontact IC card use permission list stored in said memory unit.

3. A portable terminal according to claim 1,
wherein when the power of said controller is off,
said noncontact IC card is configured to turn on the power of said controller; and
said controller, after powered on, is configured to read the subscriber number of said subscriber information card and to compare the read subscriber number with the noncontact IC card use permission list stored in said memory unit.

4. The portable terminal according to claim 1,
wherein when the power of said controller is off,
said noncontact IC card is configured to read the subscriber number of said subscriber information card, to compare the read subscriber number and the noncontact IC card use permission list stored in said memory unit to judge whether or not the relevant subscriber number is in the list, and to decide whether or not to permit the use of said noncontact IC card based on the judgment result.

5. A portable terminal according to claim 1,
wherein after the function of said noncontact IC card is stopped, said controller is configured to enable the function of said noncontact IC card in response to input password information.

6. A method in a portable terminal, including a noncontact IC card, configured to receive a subscriber information card, comprising steps of:
preparing in advance a noncontact IC card use permission list on which numbers of subscribers permitted to use the noncontact IC card are registered;
judging whether or not a subscriber number recorded on the subscriber information card is in the list by comparing the subscriber number recorded on said subscriber information card with said noncontact IC card use permission list; and
stopping only a function of said noncontact IC card in response to the judgment that the subscriber number recorded in the subscriber information card is not included in said list while permitting functions of the portable terminal to be carried out.

7. A computer program product encoded with instructions, which when executed by an information processor of portable terminal, including a noncontact IC card, configured to receive a subscriber information card, causes the information processor to perform a method comprising steps of:
preparing in advance a noncontact IC card use permission list on which numbers of subscribers permitted to use the noncontact IC card are registered;
judging whether or not a subscriber number recorded on the subscriber information card is in the list by comparing the subscriber number recorded on said subscriber information card with said noncontact IC card use permission list; and
stopping only a function of said noncontact IC card in response to the judgment that the subscriber number recorded in the subscriber information card is not included in said list while permitting functions of the portable terminal to be carried out.

* * * * *